(12) United States Patent
Smith et al.

(10) Patent No.: US 8,684,135 B2
(45) Date of Patent: Apr. 1, 2014

(54) SOUND BARRIERS MADE FROM SCRAP AND WASTE MATERIALS

(75) Inventors: Gregory Smith, Huntington Beach, CA (US); Anthony J. Kriech, Indianapolis, IN (US); Daniel Robinson, Martinsville, IN (US); Matthew Kriech, Brownsburg, IN (US)

(73) Assignee: Heritage Research Group, Indianapolis, IN (US)

( * ) Notice: Subject to any disclaimer, the term of this patent is extended or adjusted under 35 U.S.C. 154(b) by 0 days.

(21) Appl. No.: 13/531,838

(22) Filed: Jun. 25, 2012

(65) Prior Publication Data

US 2012/0325579 A1   Dec. 27, 2012

Related U.S. Application Data

(60) Provisional application No. 61/500,396, filed on Jun. 23, 2011.

(51) Int. Cl.
*E04B 1/84* (2006.01)

(52) U.S. Cl.
USPC ............ 181/294; 181/284; 181/286; 181/290

(58) Field of Classification Search
USPC .................................. 181/284, 290, 286, 294
See application file for complete search history.

(56) References Cited

U.S. PATENT DOCUMENTS

| | | | |
|---|---|---|---|
| 4,133,928 A * | 1/1979 | Riley et al. ......................... | 442/3 |
| 4,325,457 A | 4/1982 | Docherty et al. | |
| 7,637,062 B2 | 12/2009 | Rerup | |
| 7,913,812 B2 * | 3/2011 | Sanders ........................ | 181/290 |
| 8,276,711 B1 * | 10/2012 | McCowin et al. ............. | 181/294 |
| 8,307,950 B1 * | 11/2012 | McCowin et al. ............ | 181/294 |
| 2009/0050401 A1 | 2/2009 | Sanders | |
| 2010/0224442 A1 | 9/2010 | Sanders | |

FOREIGN PATENT DOCUMENTS

JP          10-121421 A          5/1998

OTHER PUBLICATIONS

International Search Report and Written Opinion from corresponding PCT application No. PCT/US2012/043942 dated Jan. 21, 2013 (12 pgs).

* cited by examiner

*Primary Examiner* — Forrest M Phillips
(74) *Attorney, Agent, or Firm* — Brinks Giilson & Lione

(57) ABSTRACT

Sound barrier panels that are made from various waste materials, including scrap fiberglass reinforced plastic (FRP), scrap carpet fibers, recyclable plastics and mineral wool.

15 Claims, 5 Drawing Sheets

SOUND BARRIERS MADE FROM SCRAP AND WASTE MATERIALS

RELATED APPLICATION

This application is based upon U.S. Provisional Application Ser. No. 61/500,396, filed Jun. 23, 2011 to which priority is claimed under 35 U.S.C. §120 and of which the entire specification is hereby expressly incorporated by reference.

BACKGROUND

The present invention relates generally to acoustic structures, and more particularly to sound barrier panels for eliminating or reducing noise emanating from roadways, railways, airports or other noise generating areas. Further the present invention is directed to sound barrier panels that are made from waste materials, including scrap carpet fibers, scrap fiberglass reinforced plastic (FRP) and recyclable plastics.

As new and existing residential areas and high volume highways continue to intermingle, sound barriers placed between highways and residential neighborhoods provide an effective way to control and limit the amount of traffic noise that reaches the residential neighborhoods.

In recent years, state highway commissions and transportation departments have promulgated noise level standards for highways passing through urban neighborhoods. Studies have established that exposure to highway noise can adversely impact the quality of people's lives. It has also been suggested that high decibel levels along highways may be linked to sleep disturbance, hearing loss, high blood pressure, irritability, ulcers, and heartburn, among other ailments.

The federal Environmental Protection Agency has determined that noise levels above 66 decibels are unsafe for residential areas, while 72 dB is the limit for commercial environments. As a reference for sound levels, a standard pickup truck at 50 mph produces noise at 70 dB, while a medium truck is twice as loud at 80 dB. A motorcycle can reach 90 dB, which is four times louder than the pickup truck (the decibel (dB) is a logarithmic unit).

Highway noise is not merely a function of the total sum noise of each individual vehicle. Sound sources include engine noise, tire noise, and aerodynamic noise, all of which vary by vehicle type and speed. For instance, highway noise doubles when the traffic increases from 200 vehicles per hour to 2000 vehicles per hour, or when traffic speed increases from 30 mph to 65 mph. A single semi-trailer truck at 55 mph produces as much noise as ten cars at the same speed.

Different approaches have been devised to address the problem of traffic noise. Some noise abatement systems involve designing the roads themselves to reduce vehicle noise. Lower highway speed limits within city limits can reduce noise. For new developments, buffer zones can be provided between the residential or commercial buildings and highways. On the other hand for many older neighborhoods, traffic volume has steadily increased over the years as the traffic flow on the adjacent roads has increased. For these neighborhoods, sound barriers are the most viable solution.

Effective noise abatement systems can reduce sound levels 10-15 dB, cutting the loudness of the traffic in half. Where space permits, earth barriers are relatively inexpensive and can be used to improve the ecological aesthetics of the neighborhood. This approach is common for new neighborhoods but not often available for existing residential areas. Walls, on the other hand, take up less space.

Sound barriers (also called noise barriers or acoustical barriers) reduce the sound which enters a community from a busy highway by absorbing the sound, reflecting the sound back across the highway, or forcing the sound to take a longer path over and/or around the barrier.

Sound barriers can be constructed from earth, concrete, masonry, wood, metal, and other materials. To effectively reduce sound transmission through the barrier, the material chosen must be rigid and sufficiently dense (at least 20 kilograms/square meter). All noise barrier material types are equally effective, acoustically, if they have sufficient density.

Noise barriers are required to have structural integrity, acoustic effectiveness and durability. In this regard concrete sound barrier walls are perhaps the most frequently used because they require only minimal continuing upkeep and are very weather resistant. Moreover, the ability to produce prefabricated concrete panels can simplify construction, while also providing the ability to add aesthetic features to the panels.

The present invention provides sound barriers that are made from recycled materials and which demonstrate desirable structural integrity, acoustic effectiveness and durability. Further the present invention effectively reduces sound transmission.

Most sound barriers in existence today are reflective sound barriers that do not absorb incident sound. Sound barriers that absorb incident sound reduce sound reflection in addition to reducing sound transmission. One embodiment of the present invention allows existing reflective sound barriers to be converted into sound absorbing sound barriers, further reducing overall noise levels.

BRIEF SUMMARY

According to various features, characteristics and embodiments of the present invention which will become apparent as the description thereof proceeds, the present invention provides a composition for forming a sound absorbing article which composition comprises:

carpet fibers;
cement;
an air entrainment admixture; and
water.

The present invention further provides a sound barrier which comprises:

a layer of a sound absorbing material; and
a structural article to which the layer of sound absorbing material is coupled to support the layer of sound absorbing material, wherein the layer of sound absorbing material comprises a mixture of:

carpet fibers; and
cement.

The present invention also provides a method of making a sound absorbing material which comprises:

forming a mixture of carpet fibers, cement, an air entrainment admixture, and water; and
allowing the mixture to cure into a sound absorbing material so that air bubbles are formed in the resulting sound absorbing material.

BRIEF DESCRIPTION OF THE DRAWINGS

The present invention will be described with reference to the attached drawings which are given as non-limiting examples only, in which.

DETAILED DESCRIPTION OF THE DRAWINGS AND THE PRESENTLY PREFERRED EMBODIMENTS

Figure 1:
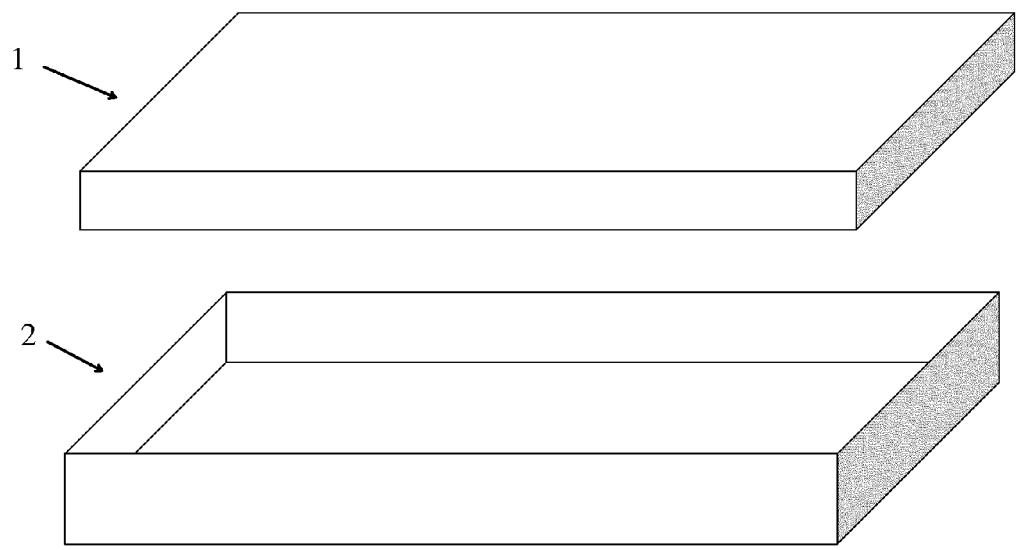
FIG. 1 is a perspective view of a form used to make a sound barrier according to one embodiment of the present invention.

The present invention is directed to acoustic structures, and more particularly to sound barrier panels for eliminating or reducing noise emanating from roadways, railways, airports or other noise generating areas. Further the present invention is directed to sound barrier panels that are made from waste materials, including scrap carpet fibers, scrap fiberglass reinforced plastic (FRP) and recyclable plastics.

The sound barrier panels of the present invention are made in part by a mixture carpet fibers, cement, water and optional an air entraining admixture and/or plastic wastes including FRP, recyclable plastics and/or mineral wool fibers or waste slag fibers (which are byproducts of mineral wool manufacturing processes). These components are mixed together to form a sound absorbing material that can be formed, e.g. cast, molded, etc. into a desired shape or coated, laminated or formed onto a supporting structure. When used, the air entraining admixture produces air bubbles in the sound absorbing mixture and can be a conventional air entraining admixture that is used in cement mixtures. The cement used in the present invention can be Portland or various other binding materials including organic or inorganic cements, hydraulic cements, hydraulic limes, porous binders, as well as other adhesives or glues.

According to one embodiment of the present invention sound absorbing materials are formed from mixtures of carpet fibers, cement and sufficient water to combine these components into a mixture that could be cured (via the cement component) into a dried form. According to other embodiments, fiberglass, including FRP and/or mineral wool fibers or waste slag and/or recyclable plastics can be included with the carpet fibers, cement and water. Recyclable plastics can include any type of plastic including recycled plastic resin numbers 3-7 which are not currently being recycled as much as resin numbers 1 and 2 (which can also be use in the present invention). For purposes of the present invention recyclable plastics can also include scrap or waste plastics.

According to the present invention waste materials that otherwise would be disposed of in landfills can be used to make the sound barriers. For example one unique and beneficial aspect of the present invention is that waste materials such as scrap and waste carpet fibers, ground scrap and waste fiberglass reinforced plastic (FRP), recyclable plastics and mineral wool fibers or waste slag, can be used to make the sound absorbing material/layer. Sources of scrap and waste fiberglass reinforced plastic include construction materials such as wall, roofing and ceiling panels, doors and door frames, automotive, marine and aircraft parts, storage tanks and plumbing parts. Sources of scrap and waste carpet fibers include carpet manufacture waste and scraps, new construction, renovation and demolition and automotive wastes. Sources of mineral wools can be mineral wool manufacturing process with waste slag being the byproducts of such processes. Recycled plastics are readily available from various consumer products and numerous industries.

According to one embodiment of the present invention the sound absorbing material is formed into laminated structure which includes a structural layer with a layer of the sound absorbing material on one or both sides of the structural layer. The structural layer is used to support the sound absorbing material which can be a layer formed on the structural layer or a panel that is coupled to the structural layer. The structural layer can be a concrete layer (panel), a wooden panel or frame, or a supporting layer/structure made from any suitably sturdy material that preferably does not readily transmit sound. In this regard metal reinforcing elements, fasteners, frames, etc. can be used; however, the use of metal supporting layers/structures that are configured so that they readily transmit sound is not preferred.

According to one embodiment of the present invention the sound barriers are constructed in two layers that are bonded together. One layer is made of structural concrete. The other layer is made of the sound absorbing material described above. The layers can be bonded together in a variety of manners. In one embodiment as described below the individual layers can be formed by pouring their mixed components into a common mold one layer at a time. Structural elements such as rebar can be added between the layers to assist in coupling the layers together. In other embodiments the different layers can be bonded or coupled together using chemical means such as adhesives, glues, epoxies, etc., or by mechanical means such as mechanical fasteners, clips, supporting framework, etc.

One manner of producing the sound barriers involves mixing carpet fibers with cement and water in a mortar mixer or other suitable mixer. The resulting mixture is then poured into forms of any desired size. Next, structural concrete layer is poured into the form on top of the sound absorbing mixture/layer. Structural elements such as metal, (e.g. steel), grids, cages, ties, etc, can be provided in the forms in the cement layer and optionally into and between the sound absorbing mixture/layer and the concrete layer to assist in attaching or coupling the layers together. If sound absorbing properties are required on both sides of the barrier the barrier can be constructed with sound absorbing material on both sides of the structural layer for a total of three layers.

For aesthetic purposes and/or improvement in sound absorbing the exposed surface of the sound absorbing layer can be contoured or textured as desired. For Example the surface(s) of the sound barriers can be configured to look like brickwork, block work, stones, or have any desired appearance. Further the exposed surface of the sound absorbing layer can be imprinted with visually appealing patterns. In addition coloring agents can be added to the mixture from which the sound absorbing material/layer is made to create colored or colored patterned sound barriers.

FIG. 1 is a perspective view of a form used to make a sound barrier according to one embodiment of the present invention. The form shown in FIG. 1 includes a top portion 1 and a bottom portion 2. In use, according to one embodiment of the present invention, a mixture of sound absorbing material as discussed herein is poured into the bottom portion 2 of the form. Next a layer of structural concrete is poured into the mold on top of the first layer of the sound absorbing material. Next a steel reinforcing mesh/grid is placed on the cement layer. Thereafter another cement layer is poured into the bottom portion 2 of the form, followed by an additional layer of the sound absorbing material.

After all these layers are poured into the bottom portion 2 of the form, the top portion 1 of the form is fitted onto or into the bottom portion 2 and pressure is applied while the cement and sound absorbing material cures.

According to one embodiment a sound barrier can be produced using a form as discussed above and include layers of sound absorbing material that are 3 inches thick and cement layers that are 1 inch thick. Of course the thicknesses of the layers can vary depending upon structural requirements, sound requirements and the overall size/thickness of the sound barrier panels. In further embodiments the last layer of sound absorbing material can be excluded to produce a sound barrier having the sound absorbing material on only one side. In this embodiment, the application of pressure is not required while the cement and sound absorbing material cures.

According to another embodiment a single sound absorbing layer can be produced using a form as discussed above for the purpose of attachment to an existing reflective sound wall. In this embodiment metal structural elements (steel grids, ties etc.) as described above are incorporated to give the single sound absorbing layer structural integrity and allow a means of attachment to an existing reflective sound wall.

Figure 2:
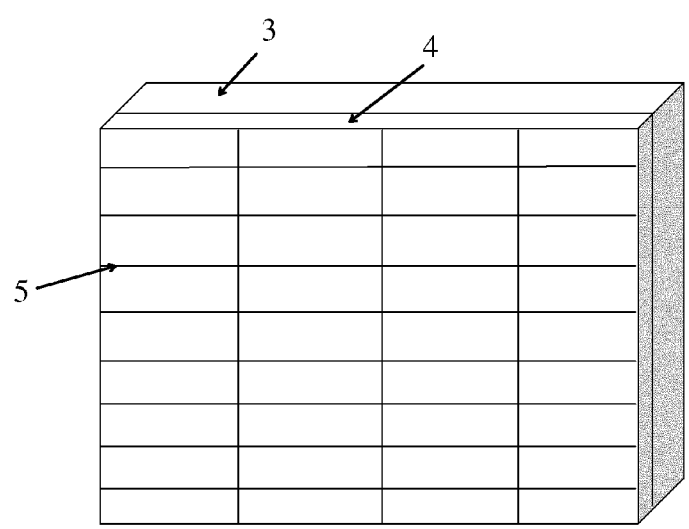
FIG. 2 is a sectioned view of a sound barrier according to one embodiment of the present invention.

FIG. 2 is a sectioned view of the sound barrier of a sound barrier according to one embodiment of the present invention. FIG. 2 depicts a sound absorbing barrier that includes one layer of sound absorbing material 3, one layer of cement 4 and a steel reinforcing mesh/grid 5.

Figure 3:
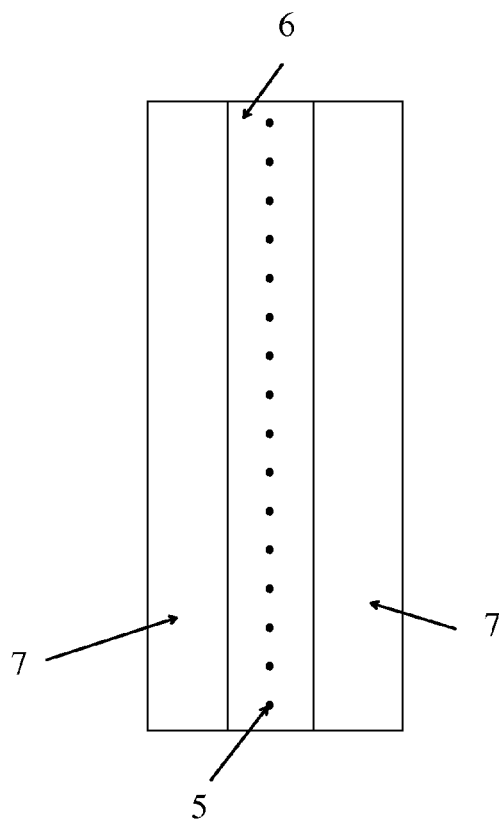
FIG. 3 is a cross-sectional view of a sound barrier similar to that shown (in section) in FIG. 2 taken from one of the sides.
Figure 4:
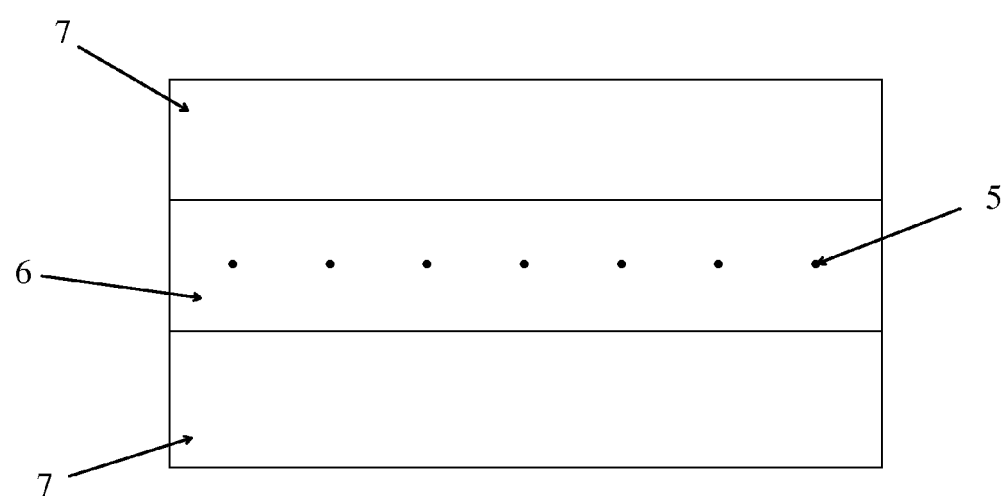
FIG. 4 is a cross-sectional view of a sound barrier similar to that show (in section) in FIG. 2 taken from one of the top or bottom.

FIG. 3 is a cross-sectional view of a sound barrier similar to that show (in section) in FIG. 2 taken from one of the sides. FIG. 4 is a cross-sectional view of a sound barrier similar to that show (in section) in FIG. 2 taken from one of the top or bottom. FIGS. 3 and 4 depict how the separately poured cement layers form a single cured cement layer 6 with the steel reinforcing mesh/grid 5 secured therein. Further FIGS. 3 and 4 depict the cured layers of sound absorbing material 7 on opposite sides of the sound absorbing barrier panel.

Additional features and characteristics of the present invention will be exemplified by the following examples which are provided as non-limiting examples only.

EXAMPLE 1

Figure 5:
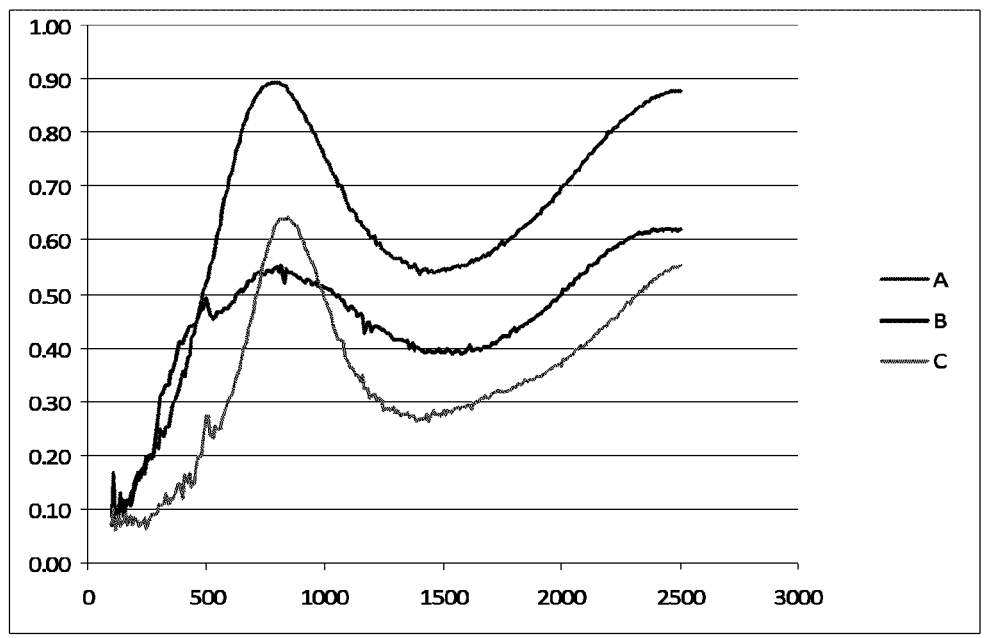
FIG. 5 is a graph of impedance tube sound absorbance test data comparing compositions of the present invention.
Figure 6:
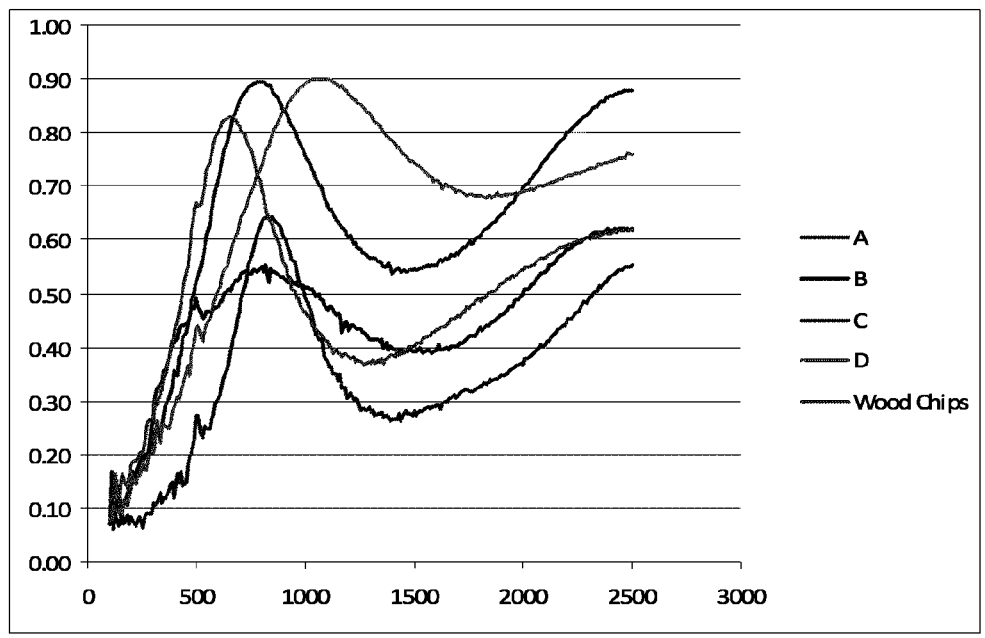
FIG. 6 is a graph of impedance tube sound absorbance test data comparing compositions of the present invention with wood chip cement composite material.

In this example samples of different mixtures of fiberglass reinforced plastic (FRP), carpet fibers, cement, water and an air entraining admixture where combined to produce the sound absorbing material according to the present invention. The samples were subjected to sound absorption measurements according to a conventional impedance tube method. The compositions of the samples in parts by weight are presented in Table 1 below. A sufficient amount of water was used to combine the listed components into a mixture that could be cure (via the cement component) into a dried form. The results of the tests are presented in FIGS. 5 and 6. The data from the impedance tube sound absorption measurements made according to ASTM method E1050 are attached in appendix A.

TABLE 1

| Sample | FRP | Carpet | Cement | Admixture |
|--------|-----|--------|--------|-----------|
| A | 40 | 40 | 250 | 0 |
| B | 40 | 40 | 350 | 0 |
| C | 40 | 40 | 450 | 0 |
| D | 40 | 40 | 450 | 4.5 |

The one-third octave analysis from impedance tube testing of the samples are provided in Table 2 as follows:

TABLE 2

| Sample | ⅓ Octave Analysis |
|--------|-------------------|
| A | 0.46 |
| B | 0.35 |
| C | 0.26 |
| D | 0.45 |
| Wood Composite | 0.41 |

From the results of the testing in Example 1 it can be concluded that according to the present invention sound barriers that are more sound absorbing than conventional wood chip sound barriers can be made from scrap and waste byproducts such as fiberglass and carpet.

EXAMPLE 2

In this example a sample of the sound absorbing material according to the present invention was tested for sound absorbance according to ASTM 423. The sound absorbing material according to the present invention was tested for surface burning characteristics according to ASTM E84. The sound absorbing material tested in this Example was prepared from a mixture that, for each square foot of resulting panel that was 4 inches thick, included 2 pounds of carpet fiber, 1 pound of fiberglass reinforced plastic, 14 pounds of Portland cement, 0.05 pounds of air entraining admixture and 3.2 pounds of water.

This mixture was mixed in a Stow MS70 8HP mortar mixer (Stow, Carson, Calif.). Such mortar mixers that are used by bricklayers were discovered to be useful in preventing the carpet fibers from matting up during the mixing.

The mixture was formed into 12 test samples, each of which was 24"×36" by 4 inches thick. The test sample (that included the 12 individual samples) weighed 1477.5 and pounds and had a surface area of 72.0 ft$^2$.

The results of the sound absorbance test are presented in Table 3 as follows:

TABLE 3

| ⅓ Octave Center Freq. (Hz) | Absorption Coefficient | Total Absorption (Sabins) |
|----------------------------|------------------------|---------------------------|
| 100 | 0.04 | 2.85 |
| 125 | 0.11 | 7.79 |
| 160 | 0.18 | 12.90 |
| 200 | 0.27 | 19.19 |
| 250 | 0.35 | 25.17 |
| 315 | 0.67 | 48.58 |
| 400 | 0.88 | 63.43 |
| 500 | 1.09 | 78.38 |
| 630 | 1.00 | 72.29 |
| 800 | 0.81 | 58.16 |
| 1000 | 0.65 | 46.72 |
| 1250 | 0.68 | 49.18 |

TABLE 3-continued

| ⅓ Octave Center Freq. (Hz) | Absorption Coefficient | Total Absorption (Sabins) |
|---|---|---|
| 1600 | 0.83 | 59.70 |
| 2000 | 0.83 | 60.09 |
| 2500 | 0.86 | 62.13 |
| 3150 | 0.88 | 63.13 |
| 4000 | 0.88 | 63.59 |
| 5000 | 0.88 | 63.21 |

The sound absorption average (SAA) was 0.74 and the noise reduction coefficient (NRC) was 0.75

Figure 7:
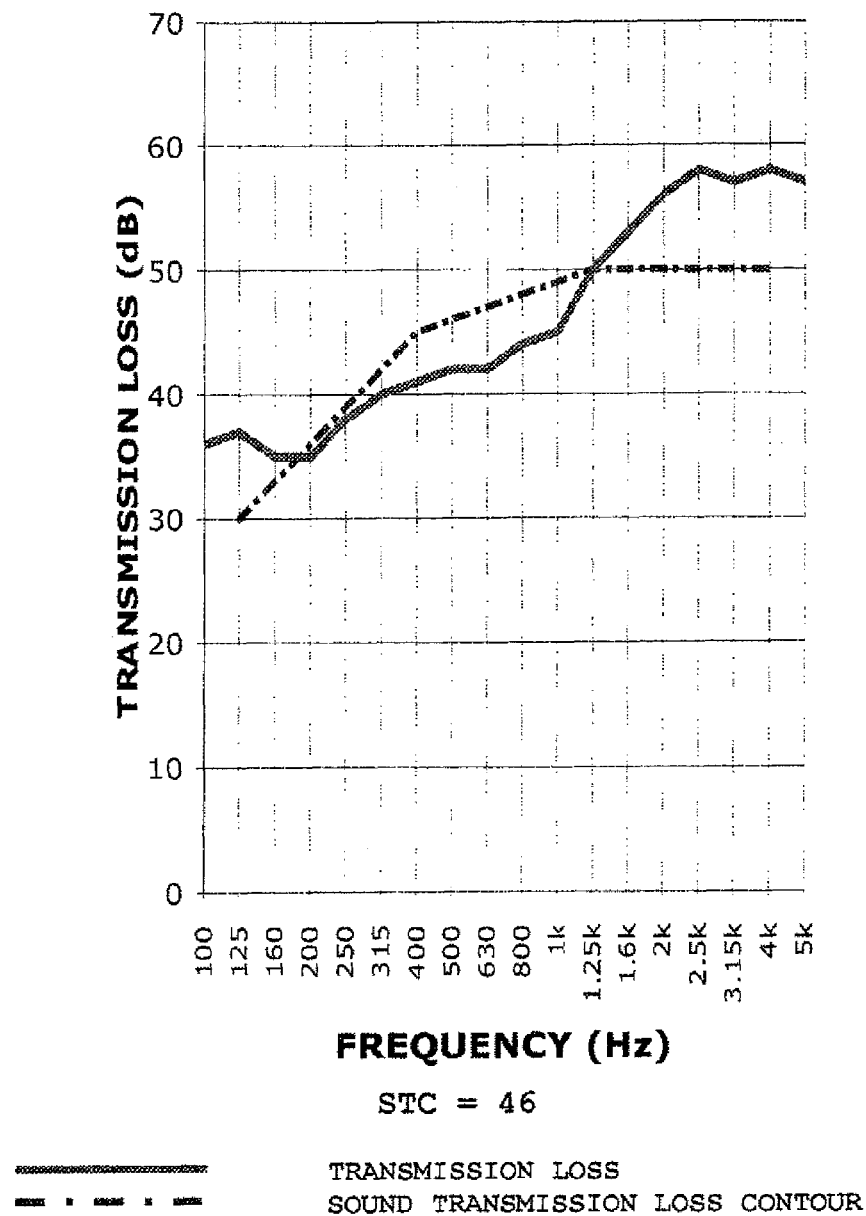
FIG. 7 is graph a sound transmission test of a sound absorbing material according to one embodiment of the present invention.

FIG. 7 is graph a sound transmission test date of this Example.

In addition to having good sound absorbing properties the sound absorbing material/layer of the present invention is inherently weather resistant due to its porous structure which improves drainage and freeze thaw resistance. The sound absorbing material of the present invention was further tested for surface burning characteristics according to ASTM E84. As a result of these tests the sound absorbing material was rated as Fire: 0 and Smoke: 20, which qualified the sound absorbing material as class A or 1 Fire Rating according to the following criteria:

Class A Fire Rating (Class I)—Flame Spread (0-25) Smoke Developed<450

Class B Fire Rating (Class II)—Flame Spread (26-75) Smoke Developed<450

Class C Fire Rating (Class III)—Flame Spread (76-200) Smoke Developed<450

EXAMPLE 3

In this a sample of the sound absorbing material according to the present invention was tested for sound transmission according to ASTM E 90. The sound absorbing material tested in this Example was prepared as in Example 2 above and was supported by a 1.5 inch backing layer of concrete that was prepared from a mixture of 3 parts by volume of coarse aggregate (number 8 gravel), 2 parts by volume natural sand 1 part by volume Portland cement and water to proper hydrate by slump test.

The dimensions of the tested sample were 47.375 inches wide by 47.375 inches high and 5.5 inches thick. The tested sample had a surface area of 15.5 ft$^2$ and weighed 748 pounds.

The results of the sound transmission test are presented in Table 4 as follows:

TABLE 4

| Frequency (Hz) | Transmission Loss (dB) | Uncertainty (dB) 95% CL | Deficiencies (dB) < CONT |
|---|---|---|---|
| 100 | 36 | 0.67 | |
| 125 | 37 | 0.67 | |
| 160 | 35 | 0.75 | |
| 200 | 35 | 0.64 | 1 |
| 250 | 38 | 0.58 | 1 |
| 315 | 40 | 0.32 | 2 |
| 400 | 41 | 0.42 | 4 |
| 500 | 42 | 0.19 | 4 |
| 630 | 42 | 0.19 | 5 |
| 800 | 44 | 0.18 | 4 |
| 1000 | 45 | 0.15 | 4 |
| 1250 | 50 | 0.14 | |
| 1600 | 53 | 0.11 | |
| 2000 | 53 | 0.10 | |
| 2500 | 58 | 0.12 | |
| 3150 | 57 | 0.07 | |
| 4000 | 58 | 0.06 | |
| 5000 | 57 | 0.06 | |

The sound transmission class (STC) was 46 and the total deficiencies were 25.

Figure 8:
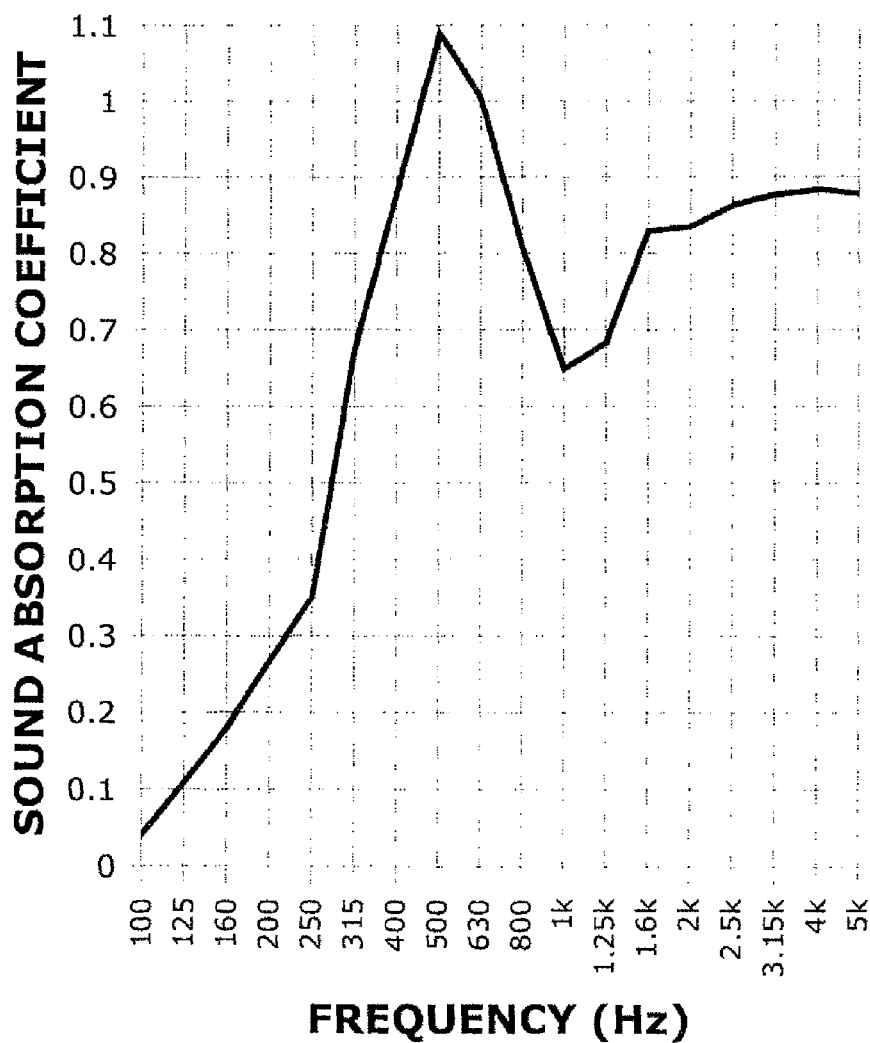
FIG. 8 is a graph of a reverberation room sound absorbance test of a sound absorbing material according to one embodiment of the present invention.

FIG. 8 is graph the sound transmission test date of this Example.

During the course of the present invention it has been determined that the sound barriers of the present invention can absorb sound over a wide range of frequencies from 500 Hz to 2500 Hz and that more than 45% of normal incident sound within this range is absorbed. A 45% normal incident sound absorption typically correlates to a 70% random incidence sound absorption. Random incidence sound absorption (reverberation room) tests on the present invention resulted in a 0.75 NRC (See FIG. 7). The ability to absorb a high percentage of sound enables the sound barriers of the present invention to suppress or avoid echo effects.

The sound barriers of the present invention can be formed as panels that can be erected into vertical barriers in a conventional manner in which adjacent panels are supported by I-beam posts along roadways, railways, airports or other noise generating areas.

Although the present invention has been described with reference to particular means, materials and embodiments, from the foregoing description, one skilled in the art can easily ascertain the essential characteristics of the present invention and various changes and modifications can be made to adapt the various uses and characteristics without departing from the spirit and scope of the present invention as described above and set forth in the attached claims.

The invention claimed is:

1. A composition for forming a sound absorbing article which composition consists essentially of 5 to 30 parts by weight of carpet fibers;
   38 to 95 parts by weight of cement;
   water;
   an air entrainment admixture; and
   a member selected from the group consisting of fiberglass reinforced plastic, recyclable plastic, mineral wool and mixtures thereof.

2. A sound barrier which comprises: a layer of a sound absorbing material; and a structural article to which the layer of sound absorbing material is coupled to support the layer of sound absorbing material, wherein the layer of sound absorbing material consists essentially of a mixture of: carpet fibers; and cement.

3. A sound barrier which comprises: a layer of a sound absorbing material; and a structural article to which the layer of sound absorbing material is coupled to supporting the layer of sound absorbing material, wherein the layer of sound absorbing material consists essentially of a mixture of: carpet fibers; cement and a member selected from the group consisting of fiberglass reinforced plastics, recyclable plastics, mineral wool and mixtures thereof.

4. A sound barrier according to claim 2, wherein the layer of sound absorbing material is formed with air bubbles in the layer.

5. A sound barrier according to claim 2, wherein the structural article comprises a layer of concrete.

6. A sound barrier according to claim 2, further including a layer of sound absorbing material on opposite sides of the structural article.

7. A sound barrier according to claim 2, wherein the sound barrier comprises a panel.

8. A sound barrier according to claim 7, wherein the panel is supported vertically on opposite sides.

9. A sound barrier according to claim 8, wherein the panel is supported by I-beams structures.

10. A method of making a sound absorbing material which comprises:
    forming a mixture which consists essentially of carpet fibers, cement, and water; and
    allowing the mixture to cure into a sound absorbing material so that air bubbles are formed in the resulting sound absorbing material.

11. A method of making a sound absorbing material according to claim 10, wherein carpet fibers comprise at least one of scrap and waste carpet.

12. A method of making a sound absorbing material according to claim 10, wherein the mixture is allowed to cure in a form.

13. A sound barrier which comprises the sound absorbing material of claim 12.

14. A method of making a sound absorbing material which comprises:
    forming a mixture which consists essentially of carpet fibers, cement, water and a member selected from the group consisting of fiberglass reinforced plastics, recyclable plastics, mineral wool and mixtures thereof; and
    allowing the mixture to cure into a sound absorbing material so that air bubbles are formed in the resulting sound absorbing material.

15. A method of making a sound absorbing material which comprises:
    forming a mixture which consists essentially of carpet fibers, cement, water and an air entrainment admixture
    allowing the mixture to cure into a sound absorbing material so that air bubbles are formed in the resulting sound absorbing material.

* * * * *

UNITED STATES PATENT AND TRADEMARK OFFICE
CERTIFICATE OF CORRECTION

| | | |
|---|---|---|
| PATENT NO. | : 8,684,135 B2 | Page 1 of 1 |
| APPLICATION NO. | : 13/531838 | |
| DATED | : April 1, 2014 | |
| INVENTOR(S) | : Gregory Smith et al. | |

It is certified that error appears in the above-identified patent and that said Letters Patent is hereby corrected as shown below:

<u>On the Title Page</u>

(74) *Attorney, Agent or Firm* – Brinks "Giilson" & Lione should be substituted with Brinks -- Gilson -- & Lione.

<u>In the Specification</u>

In Column 4, line 54 delete the word "Example" and substitute -- example -- in its place.

<u>In the Claims</u>

In Column 8, line 41 delete "which composition consists essentially of 5 to 30 parts by" and substitute with -- which composition consists essentially of:
    5 to 30 parts by -- in its place.

Signed and Sealed this
Twenty-fourth Day of March, 2015

Michelle K. Lee
*Director of the United States Patent and Trademark Office*